US010615471B2

(12) United States Patent
Xiang

(10) Patent No.: US 10,615,471 B2
(45) Date of Patent: Apr. 7, 2020

(54) COOLING MECHANISM FOR BATTERIES USING L-V PHASE CHANGE MATERIALS

(71) Applicant: Xiaodong Xiang, Danville, CA (US)

(72) Inventor: Xiaodong Xiang, Danville, CA (US)

( * ) Notice: Subject to any disclaimer, the term of this patent is extended or adjusted under 35 U.S.C. 154(b) by 162 days.

(21) Appl. No.: 15/827,224

(22) Filed: Nov. 30, 2017

(65) Prior Publication Data

US 2018/0083330 A1 Mar. 22, 2018

Related U.S. Application Data

(62) Division of application No. 14/786,541, filed as application No. PCT/US2014/035116 on Apr. 23, 2014, now Pat. No. 9,865,907.
(Continued)

(51) Int. Cl.
| | |
|---|---|
| *H01M 10/6569* | (2014.01) |
| *H01M 10/6563* | (2014.01) |
| *H01M 2/02* | (2006.01) |
| *H01M 2/10* | (2006.01) |
| *H01M 10/6556* | (2014.01) |
| *H01M 10/6551* | (2014.01) |
| *H01M 10/613* | (2014.01) |
| *H01M 10/625* | (2014.01) |
| *H01M 10/6567* | (2014.01) |

(52) U.S. Cl.
CPC ..... *H01M 10/6569* (2015.04); *H01M 2/0267* (2013.01); *H01M 2/1077* (2013.01); *H01M 10/613* (2015.04); *H01M 10/625* (2015.04); *H01M 10/6551* (2015.04); *H01M 10/6556* (2015.04); *H01M 10/6563* (2015.04); *H01M 10/6567* (2015.04); *H01M 2220/20* (2013.01)

(58) Field of Classification Search
CPC ......... H01M 10/6569; H01M 10/6563; H01M 2/10; H01M 2/03; H01M 10/613
See application file for complete search history.

(56) References Cited

U.S. PATENT DOCUMENTS

| | | | |
|---|---|---|---|
| 6,102,103 | A | 8/2000 | Zobel et al. |
| 2002/0164473 | A1 | 11/2002 | Buckley |

(Continued)

OTHER PUBLICATIONS

International Search Report in the parent PCT application No. PCT/US2014/035116, dated Jan. 21, 2015.
(Continued)

*Primary Examiner* — Kenneth J Douyette
(74) *Attorney, Agent, or Firm* — Chen Yoshimura LLP

(57) ABSTRACT

A 3-D "phase change heat exchange" structure and method are used in a rechargeable battery to dissipate heat from surfaces of the battery cells and lower the temperature inside the battery cells. The battery cells are placed inside an enclosure and spaced apart from each other with free spaces in between. A liquid to vapor phase change material (L-V PCM) is provided inside the enclosure. A hydrophilic thin film or wick or fiber structure is provided on the cell surfaces to help form a thin liquid layer of the L-V PCM over cell surfaces. During operation, the L-C PCM is evaporated at the cell surfaces and condenses back to a liquid either on the battery enclosure or in an external heat exchanger, and drips back on top of the cells. The designs extend the battery life and improve the battery performance significantly.

5 Claims, 2 Drawing Sheets

Related U.S. Application Data

(60) Provisional application No. 61/854,373, filed on Apr. 23, 2013.

(56) References Cited

U.S. PATENT DOCUMENTS

| | | |
|---|---|---|
| 2004/0089442 A1 | 5/2004 | Goodson et al. |
| 2005/0007068 A1* | 1/2005 | Johnson .................. B25F 5/02 320/110 |
| 2005/0039883 A1 | 2/2005 | Kramer et al. |
| 2008/0078542 A1 | 4/2008 | Gering et al. |
| 2009/0004556 A1 | 1/2009 | Al-Hallaj et al. |
| 2010/0230075 A1 | 9/2010 | Mathur et al. |
| 2011/0159339 A1 | 6/2011 | Gregor et al. |
| 2011/0159340 A1 | 6/2011 | Hu et al. |
| 2011/0206965 A1 | 8/2011 | Han et al. |
| 2012/0003523 A1 | 1/2012 | Schaller et al. |
| 2012/0034501 A1* | 2/2012 | Hermann ................ H01M 2/34 429/62 |
| 2012/0176748 A1 | 7/2012 | Raynaud |
| 2012/0227926 A1 | 9/2012 | Field et al. |
| 2013/0004806 A1 | 1/2013 | Wang |
| 2013/0084487 A1 | 4/2013 | Kwak et al. |

OTHER PUBLICATIONS

IPRP in the parent PCT application No. PCT/US2014/035116, dated Jan. 21, 2015.

* cited by examiner

COOLING MECHANISM FOR BATTERIES USING L-V PHASE CHANGE MATERIALS

CROSS-REFERENCE TO RELATED APPLICATION

The present application is a division of U.S. application Ser. No. 14/786,541, filed Oct. 22, 2015, now U.S. Pat. No. 9,865,907, the disclosure of which is incorporated herein by reference.

FIELD OF THE INVENTION

The present invention relates to batteries. In particular, it relates to a cooling mechanism for rechargeable batteries.

BACKGROUND OF THE INVENTION

Battery life, ability to charge and discharge rapidly, and safety are three critical issues for different rechargeable batteries to become the workhorse of electrical vehicles (EV) and many other applications. How to manage the temperature inside the battery cells so that it stays at near room temperature (25 C) is a key to solving problems related to all three issues. This is because 1) excessive heat during operation or shelf time above this temperature will cause excessive irreversible chemical reactions, which in turn will cause ion channels to be blocked and batteries to lose their ability to be re-charged; 2) charge or discharge more rapidly through battery internal resistance will cause the temperature inside the cell to increase more with a given heat dissipation rate for a given packaging technologies, and cell will lose their capacity and life; 3) if the temperature exceeds a catastrophic failure temperature (thermal runaway) causing strong chemical reaction, the cells will explode.

Conventionally, there are four different basic methods of heat management for batteries. Common to all, batteries are first manufactured in small cells with different geometries and then packaged into a large volume; this approach will decrease the temperature difference between cell surfaces and hottest point inside the cell. Different heat management methods are different in their ways to dissipate the heat from the surface of the cells to outside of the large battery package. The first method is forced air convection method, i.e. using electrical fans to cause air flow in the wind tunnel and cool off the cell surfaces in the wind tunnel. This method is simple, but not energy efficient, since a decrease in the temperature difference between cell surfaces and air in the tunnel entrance requires a linear increase in the speed of air flow, while the required electrical power increases as the third power of the air flow speed. This is evident in the cooling methods of power plants.

The second method is forced liquid convection. Liquid, instead of air is used in the forced convection. Since the liquid has a larger heat capacity than gas, the cooling is more effective, but the power required to speed up liquid flow and increase cooling is still the third power of the speed of liquid flow. For liquid to directly flow over cell surfaces in the space between cells, the flow resistance is too large to keep required electrical power low enough for a dense cell packaging.

The third method (US2009004556A1) is to package solid to liquid phase change materials (PCMs) with the cells. As the cell surfaces heat up, the PCMs absorb the heat and melt into liquid, storing the heat energy while keeping the temperature constant. This method is effective to increase the charging and discharging speed for a given heat dissipation rate due to temporary heat storage by the PCMs. However, the PCM capacity is limited since for the PCM volume far away from the cell surface to reach the melting temperature, the cell surface temperature still is required to be much higher than the melting temperature of the PCMs due to the poor thermal conductivity of PCMs.

The last method (US2011206965A1) is a 2-D heat pipe method. Two-dimensional heat pipes in the form of thin sheets are fabricated and the hot ends are mounted on the battery cell surfaces and the cool ends are mounted with fins for more effective forced air-cooling. The liquid to vapor PCM with a desired boiling temperature is sealed inside the 2-D heat pipes. As the cell surface temperature rises, which can exceed the PCM boiling point, the PCM on the heat pipe inside wall surface vaporizes and bring the heat energy to the cool ends to condense back into liquid again. The heat energy transferred to the cool ends is dissipated by the airflow. Fabrication of 2-D heat pipes is too expensive to implement in industrial applications, and cooling is still limited by the forced air cool method.

SUMMARY OF THE INVENTION

This invention provides more effective and efficient methods, designs and apparatus to lower the temperature inside rechargeable battery cells and as a consequence, extend the battery life and increase the battery charging and discharging speed and safety significantly.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a battery which includes: an enclosure; a plurality of battery cells electrically connected to each other and disposed within the enclosure, the battery cells being spaced apart from each other with free spaces between them; and a liquid to vapor phase change material (L-V PCM) inside the enclosure.

In another aspect, the present invention provides a battery system which includes: a battery, including: a battery enclosure; a plurality of battery cells electrically connected to each other and disposed within the battery enclosure, the battery cells being spaced apart from each other with free spaces between them; and a liquid to vapor phase change material (L-V PCM) inside the battery enclosure, wherein the battery enclosure includes a vapor outlet for allowing a vapor of the L-V PCM to be transferred out of the battery enclosure, and a liquid inlet located at a top of the battery enclosure for allowing a liquid of the L-V PCM to be introduced into the battery enclosure; a heat exchanger including: a heat exchanger enclosure, having a vapor inlet, and a liquid outlet disposed at a bottom of the heat exchanger enclosure; a plurality of containers disposed inside the heat exchanger enclosure, each containing a solid to liquid phase change material; a first pipe connecting the vapor outlet of the battery enclosure to the vapor inlet of the heat exchanger for allowing the vapor of the L-V PCM to flow from the battery enclosure to the heat exchanger enclosure; and a second pipe connecting the liquid outlet of the heat exchanger to the liquid inlet of the battery enclosure for allowing the liquid of the L-V PCM to flow from the heat exchanger enclosure to the battery enclosure; wherein the heat exchanger enclosure is disposed above the battery enclosure.

DETAILED DESCRIPTION OF THE PREFERRED EMBODIMENTS

Figure 1:
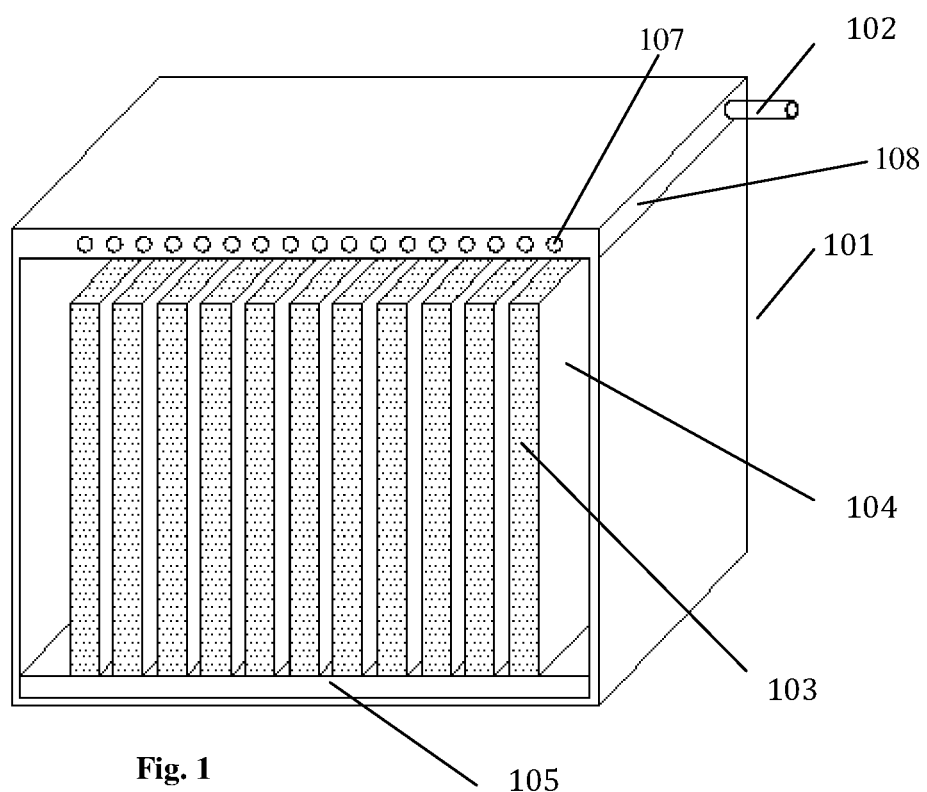
FIG. 1 is a front cut-away view which schematically illustrates a battery according to a first embodiment of the present invention.

It is understood that the examples and embodiments described herein are for illustrative purposes only and that various modifications or changes in light thereof will be suggested to persons skilled in the art and are to be included within the spirit and purview of this application and scope of the appended claims.

In embodiments of the present invention, 3-D super-thermal conducting heat management design is adopted to lower the temperature inside rechargeable battery cells. A 3-D phase change heat exchange method is used to dissipate heat from the cell surfaces. In some embodiments, cells with different geometries, including flat plate, cylindrical shape with solid or empty center, etc., are packaged in a 3-D vacuum-sealed enclosure with small free spaces between cell surfaces. Thin flat plates are preferred geometry; thinner thicknesses can provide lower temperature difference between cell surface and hot points inside the cells, and therefore, higher performance in all three aspects discussed above.

A liquid to vapor phase change material (L-V PCM) with a desired boiling temperatures is used to wet the cell surfaces during battery operation. In some embodiments, the cell surfaces are coated with a hydrophilic film, which keeps the cell surface wet before operation through capillary force effect. Additional wick or fiber materials can also be implemented for capillary force effect to keep the cell surfaces wet before the battery operation.

During battery operation, as the cell surface temperature rises, which can exceed the boiling temperature of the L-V PCM liquid, the liquid layer evaporates and carries away the heat from the cell surfaces. The heat carried by the vapor is transferred to the cold surfaces described below and the vapor is condensed back into the liquid. In this way, all cell surfaces are thermally "short circuit" connected with negligible temperature difference to the cold surface. The liquid then is transferred back to the cell surface, e.g. dripped or showered onto the top of the cells, to continue the cycle.

In some embodiments, the cold surfaces are the surfaces of the top ceiling plate or the surrounding side walls of the battery cell enclosure, which may be cooled by forced liquid convection or air convection. The condensed liquid from the top surface of the enclosure falls down to a dish above the cells by gravitational force, and liquid in the dish which has an array of small apertures is dripped down to the cell surfaces through the apertures ("falling film"). Other methods, such as pumps and sprayers can also be used to transfer the condensed liquid and shower the liquid onto the cell surfaces.

In some embodiments, the cold surfaces are the surfaces of containers, which contain a solid to liquid PCM (S-L PCM) with a melting temperature slightly lower than the desired maximum cell surface temperature. The desired maximum cell surface temperature is a temperature that will achieve acceptable life, performance and safety of the battery. The S-L PCM containers are packaged in a different 3-D enclosure with their surfaces spaced away from each other with small gaps. The surfaces of S-L PCM container can be coated with a hydrophobic thin film to increase the heat exchange coefficient of vapor to liquid phase change of the L-V PCM. The enclosure for the S-L PCM containers and battery cell enclosure are connected with a pipe of desired diameter, and preferably the PCM containers are placed on the top of the battery enclosure, which enable the condensed liquid to fall back to the top dish in the battery enclosure by gravitational force. The S-L PCM containers can have a geometry of flat plate or cylindrical shape, preferably with thin thickness or small diameter. In this way all battery cell surfaces and S-L PCM container surfaces are thermally "short circuited" with negligible temperature difference, and heat on the battery cell surfaces is then transferred on the surface of S-L PCM containers and thermally stored in the PCM materials as the PCM materials melt into the liquid. In some embodiments, after the battery operation, the heat stored in S-L PCM is dissipated by air convection with a relatively low speed of airflow, and therefore small power fans are required. The volume and weight of the S-L PCM required to store heat energy for a complete discharge of a battery is a fraction of the battery enclosure volume and weight, and the energy for delayed air cooling is less than 1% of the battery capacity.

In a first embodiment, illustrated in FIGS. 1 (front cut-away view) and 2 (top cross-sectional view), the battery includes a vacuum sealed battery enclosure 101, a plurality of cooling channels 107 arranged inside a ceiling plate 108 of the battery enclosure, cooling liquid inlet 102 and outlet 106 in fluid communication with the cooling channels, and a plurality of battery cells 103 electrically connected to each other and placed inside the battery enclosure. The battery enclosure 101 may be made of metal, plastic and/or other suitable materials. Preferably, the ceiling plate 108 is made of metal or other materials with good thermal conductivity.

The battery cells can be any suitable types and their structures and not described in detail here. A preferred shape of the battery cells is a flat plate with a small thickness (e.g., about 1 to 10 mm as the cost of manufacturing allows). The cells are spaced apart from each other with free spaces between them. For example, when the cells are thin plates, they are arranged in parallel, and the free space between neighboring cells may be 0.1 to 10 mm wide. The cells may have other shapes than that shown in FIG. 1; for example, they may be cylinders with their cylindrical axes arranged in parallel on a rectangular grid or triangular grid, and the nearest surfaces between neighboring cells may be 1 to 10 mm apart.

A liquid to vapor phase change materials (L-V PCM) 105 is sealed inside the battery enclosure 101. The L-V PCM has a boiling temperature suitable for the desired operating temperature range of the battery. In some examples, the boiling temperature of the L-V PCM is about 30 to 60 degrees. The L-V PCM normally exists as a liquid and pools at the bottom of the battery enclosure when the battery is cool, e.g. when it is not charging or discharging and its temperature is near that of the environment.

Preferably, the surface of the battery cells 103 is coated with a hydrophilic thin film 104 to help distribute a thin liquid layer of the L-V PCM on the cell surfaces. The thin film may be, for example, nano-structured SiO2. A wick or fiber structure, such as sintered metal powder, screen, grooved wicks, can also be formed on the cell surface. The hydrophilic film and/or wick or fiber structure can help to keep the cell surface wet through capillary force effect even when the battery is not in operation.

During battery operation (charging or discharging), as the temperature of the cell surfaces rise, which can exceed the boiling temperature of the L-V PCM, the thin liquid layer of L-V PCM on the cell surfaces evaporates, carrying away heat from the cell surfaces. The vapor of the L-V PCM condenses back into liquid on the inside surface of the ceiling plate 108, releasing the heat to the ceiling plate. This way, heat is transferred from the battery cell surface to the ceiling plate 108, and the cell surfaces are thermally "short circuited" to the ceiling plate.

The L-V PCM that condenses on the inside surface of the ceiling plate 108 can drip down onto the top of the cells 103, or flow back to the bottom of the battery enclosure 101 along the vertical side walls. The shape of the ceiling plate 108 may be designed to facilitate the flow and/or dripping. For example, parallel downward-pointing ridges may be formed on the inside face of the ceiling plate, located above the battery cells, to help the liquid drip onto the cells. The liquid PCM that flows back to the bottom of the battery enclosure can be spread over the cell surfaces by the hydrophilic film and/or the wick or fiber structure. The liquid can then be evaporated from the cell surfaces again to continue the cycle.

Figure 2:
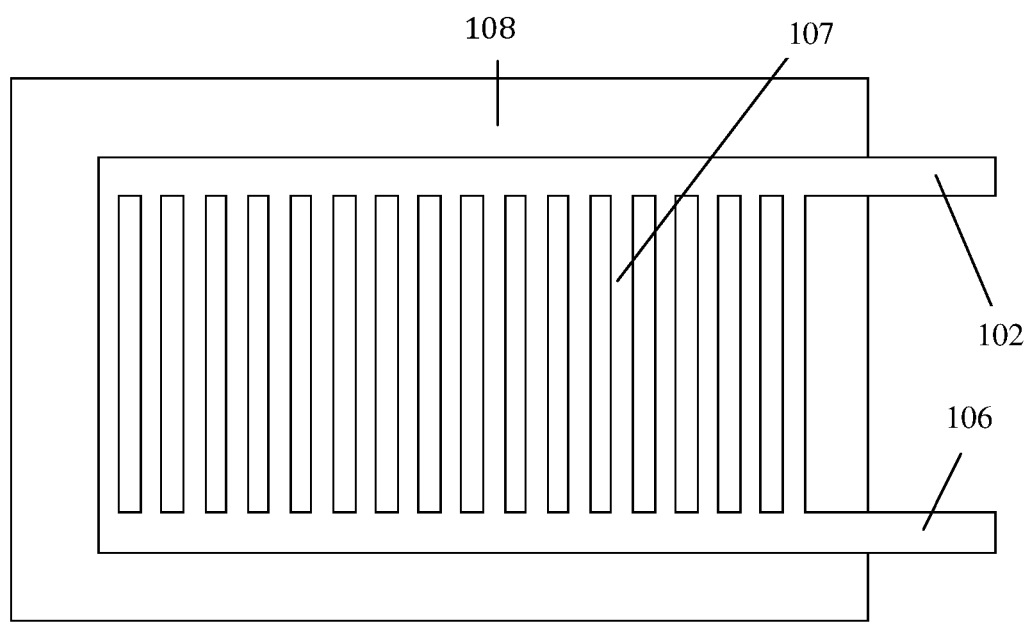
FIG. 2 is a top cross-sectional view of a ceiling plate of the battery of FIG. 1 schematically illustrating the cooling pipe arrangement.

The ceiling plate 108 is preferably made of metal (or other material with good thermal conductivity) with fluid channels 107 inside; a cooling fluid is supplied to the cooling channels via the inlet 102, flows through the channels and is removed via the outlet 106 to carry away the heat from the ceiling plate. The cooling fluid is cooled by an external cooling arrangement (not shown in FIGS. 1 and 2) which may employ conventional cooling methods such as forced air or liquid cooling, natural convection cooling, etc., before returning to the fluid channels 107.

Figure 3:
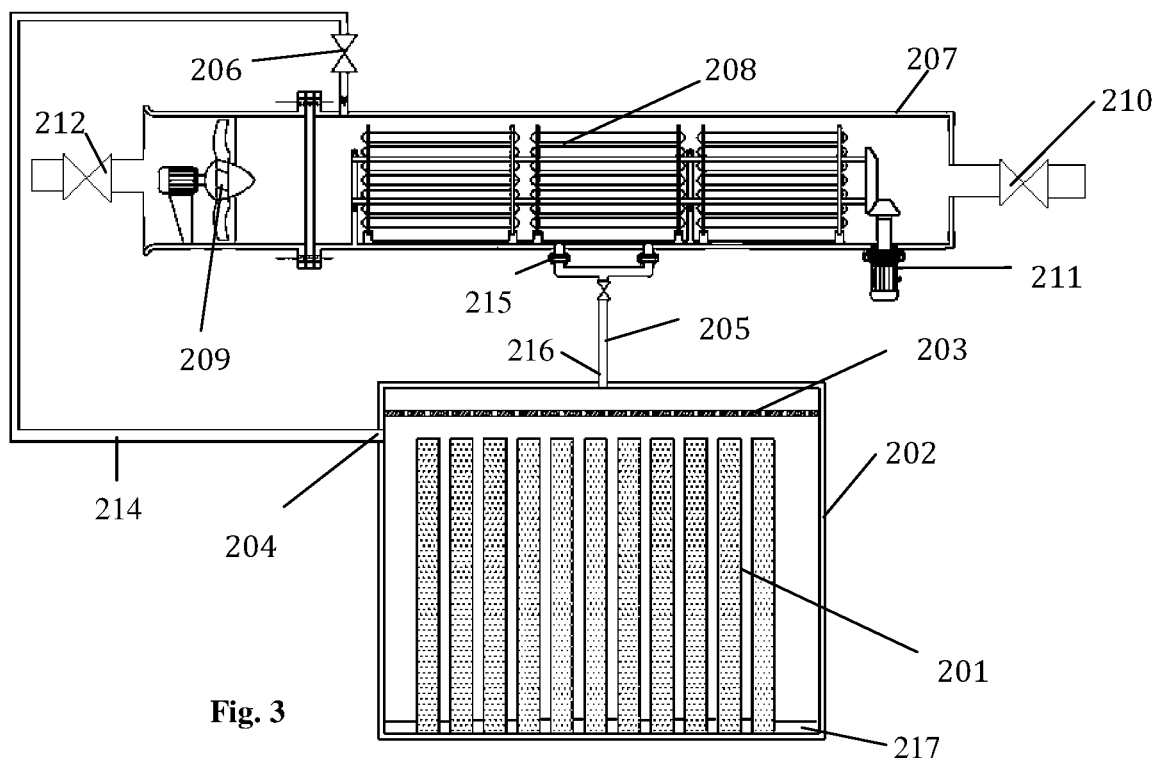
FIG. 3 schematically illustrates a battery and a battery with an S-L PCM system according to a second embodiment of the present invention.
Figure 4:
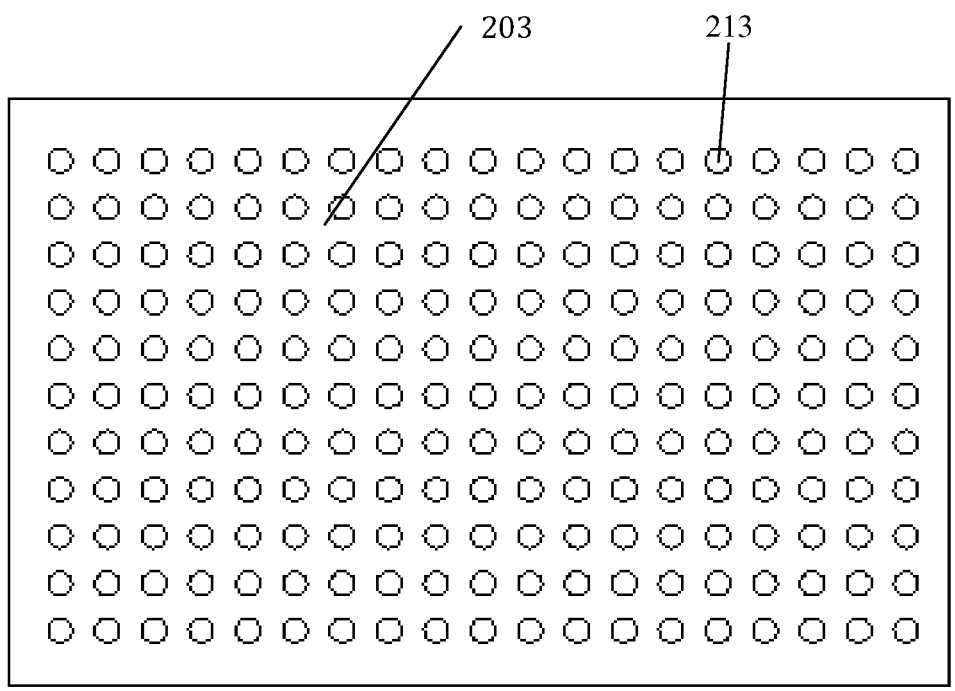
FIG. 4 schematically illustrates a dish with apertures used in the battery in the embodiment of FIG. 3.

In a second embodiment, illustrated in FIGS. 3 and 4, battery cells 201 are placed in a battery enclosure 202 in a similar manner as in the first embodiment. An L-V PCM 217 is provided inside the battery enclosure 202 and normally pools at the bottom of the battery enclosure when the battery is cool. A hydrophilic thin film and/or wick or fiber structure may be provided on the cell surface as in the first embodiment. Unlike the first embodiment, the vapor of the L-V PCM is transferred from the battery enclosure 202 to a heat exchanger via a vapor outlet 204 located near the top of the battery enclosure.

The heat exchanger includes a vacuum sealed enclosure 207; arranged inside the enclosure are a plurality of containers 208 which contain a solid to liquid phase change maternal (S-L PCM). The S-L PCM, which stays as a solid at the environmental temperature, has a melting temperature lower than the desired maximum cell surface temperature. In some examples, the melting temperature of the S-L PCM is about 25 to 60 degrees. A pipe 214 connects the vapor outlet 204 of the battery enclosure to the heat exchanger enclosure 207 via a vapor inlet with valve 206. Another pipe 205 connects a liquid outlet 215 located at the bottom of the heat exchanger enclosure 207 and a liquid inlet 216 located at the top of the battery enclosure 202. The heat exchanger is placed higher than the battery so that the liquefied L-V PCM can flow from the heat exchanger enclosure 207 to the battery enclosure 202 under gravitational force.

During battery operation, as the cell surfaces temperature rises, which can exceed the boiling temperature of the L-V PCM, the thin liquid L-V PCM layer on the cell surface evaporates, carrying away the heat from the cell surfaces. The vapor exits the cell enclosure 202 through the vapor outlet 204, pipe 214 and inlet/valve 206 to enter the heat exchanger enclosure 207. The vapor then condenses back into a liquid on the cold surfaces of the S-L PCM containers 208, heating up and melting the S-L PCM contained therein. The S-L PCM is contained in multiple containers 208 to increase the contact surface between the L-V PCM vapor and the S-L PCM which promotes efficient heat exchange. The condensed L-V PCM liquid flows or drips to the bottom of the enclosure 207, and flows to the battery enclosure 202 via the liquid outlet 215, pipe 205 and liquid inlet 216.

Inside the battery enclosure 202, a dish 203 with an array of apertures 213 (see FIG. 4) is placed below the liquid inlet 216 and above the cells 201. The liquid L-V PCM returned from the heat exchanger via the inlet 216 accumulates on the dish 203 and drips through the apertures 213 onto the cells. The liquid L-V PCM returned from the inlet 216 may also flow to the bottom of the battery enclosure 202, and then spread over the cell surfaces by the hydrophilic film and/or the wick or fiber structure. The L-V PCM is evaporated from the cell surface again to continue the cycle.

Optionally, the S-L PCM containers 208 are mounted on a rotor which can be rotated slowly or from time to time by a motor 211, so that the S-L PCM in multiple containers 208 can be heated more evenly.

During battery operation, the heat generated by the cells 201 is carried by the L-V PCM to the S-L PCM containers 208 and stored therein by melting the S-L PCM. After the battery operation ends, the S-L PCM is cooled and changes back into a solid. To cool the S-L PCM, air ventilation ports with respective valves 212 and 210 are provided on the heat exchanger enclosure 207. After battery operation ends, the vapor inlet valve 206 is closed and air vent valves 210 and 212 are opened. A fan 209 blows air through the heat exchanger enclosure 207 to cool off the surfaces of S-L PCM container carrying away the heat energy stored in S-L PCM; as container surfaces are cooled off, S-L PCM is condensed back into solid form.

In some embodiments, the L-V PCM may be but is not limited to, for example, water, alcohol, etc. The selection of the boiling temperature of the L-V PCM depends on the operation temperature range of the battery cell surfaces. Because safety is a concern, the L-V PCM should be safe to use in the battery environment. The S-L PCM may be but is not limited to, for example, paraffin waxes. The melting temperature of the S-L PCM should be below the desired maximum cell surface temperature.

The battery structures described above can be seen as a 3-D phase change heat exchange structure in that the heat exchange surfaces, i.e. the battery cell surfaces where liquid-to-vapor phase transition occurs, is in the form of multiple surfaces arranged in a 3-D manner within a 3-D space. This is accomplished by making the cells spaced apart from each other with free spaces between the multiple cell surfaces for the L-V PCM vapor to travel. In comparison, conventional heat pipes structures use either a tube shape (which can be considered a 1-D structure) or a thin flat shape (which can be considered a 2-D structure, such as that described in the last conventional method discussed in the Background section of this disclosure).

The battery structure described in the above embodiments offer high cooling effectiveness as the surfaces of the cells can be kept constant near the temperature of the cold surface or the melting point of the S-L PCM. In rechargeable battery applications, the key challenge is how to effectively transfer the heat from the inside of the battery cells to the cell surface and then away from the cell surface. In the third conventional method discussed in the Background section of this disclosure, while the heat generated by the battery cells are ultimately absorbed by the S-L PCM, the heat exchange between the cells and the S-L PCM is still limited by the thermal conductivity of the S-L PCM. In embodiments of the present invention, by using the L-V PCM, heat is effectively transferred from the cell surface to the ceiling plate or the S-L PCM.

In the second embodiment, the volume and weight of the S-L PCM required to store the heat energy for a complete discharge of the battery is a fraction of the volume and weight of the battery enclosure, and the energy cost for delayed air cooling of the S-L PCM can be less than 1% of the battery capacity.

It will be apparent to those skilled in the art that various modification and variations can be made in the rechargeable battery structure and related method of the present invention without departing from the spirit or scope of the invention. Thus, it is intended that the present invention cover modifications and variations that come within the scope of the appended claims and their equivalents.

What is claimed is:

1. A battery comprising:
    an enclosure;
    a plurality of battery cells electrically connected to each other and disposed within the enclosure, the battery cells being spaced apart from each other with free spaces between them;
    a liquid to vapor phase change material (L-V PCM) inside the enclosure and in contact with surfaces of the battery cells to wet the surfaces of the battery cells; and
    a hydrophilic thin film or a wick or fiber structure disposed on surfaces of the battery cells, wherein the hydrophilic thin film or the wick or fiber structure is configured to form a thin liquid layer of the L-V PCM over the surfaces of the battery cells.

2. The battery of claim 1, wherein the enclosure has a top ceiling plate forming a top ceiling of the enclosure, the top ceiling plate having a plurality of channels for flowing a cooling liquid, an inlet for supplying the cooling liquid into the channels and an outlet for removing the cooling liquid.

3. The battery of claim 1, wherein the enclosure includes a vapor outlet for allowing a vapor of the L-V PCM to be transferred out of the enclosure, and a liquid inlet located at a top of the enclosure for allowing a liquid of the L-V PCM to be introduced into the enclosure.

4. The battery of claim 3, further comprising a dish having a plurality of apertures, disposed inside the enclosure below the liquid inlet and above the battery cells.

5. The battery of claim 1, wherein the battery cells are flat plate shaped with a thickness of about 1 to 10 mm and the free spaces between battery cells is about 0.1 to 1 mm wide.

* * * * *